United States Patent Office 3,365,309
Patented Jan. 23, 1968

3,365,309
PROCESS FOR PREPARING
DEHYDRATED FRUITS
Morton Pader, Teaneck, and Carl G. Richberg, Ridgefield, N.J., assignors to Lever Brothers Company, New York, N.Y., a corporation of Delaware
No Drawing. Filed Sept. 6, 1963, Ser. No. 307,022
7 Claims. (Cl. 99—204)

This invention relates to a process for dehydrating fruits. More particularly, it is concerned with the dehydrated products therefrom.

It is known to dry fruits, e.g., apples, having a high percentage of natural water therein by exposure to the sun or by an artificial heat treatment to remove part of this natural water. Dehydrated foods, e.g., vegetables and fruits, have also been provided by slicing the food, blanching the sliced food, immersing the blanched food into a sugar solution and then drying by artificial means, such as oven drying (U.S. Pat. No. 2,420,517).

It is also known to add dry sugar to a partially dehydrated and pressed fruit; after subsequent grinding and further dehydrating, an end product is provided with a low moisture content, e.g., 5% (U.S. Pat. No. 2,451,312). Furthermore, it is known that a product, e.g., a fruity confection, may be formed from a sliced fruit which has been coated with dry sugar or a sugar solution and subsequently dried (U.S. Pat. Nos. 3,020,164; 144,592; 1,033,637; and 1,400,191). A soft pulverulized fruit or a translucent, that is, a non-opaque fruit, may be formed by immersing a sliced fruit into a sugar solution followed by a drying operation (U.S. Pat. Nos. 1,009,329; 1,634,-295; 1,195,911; and 2,066,574). A sugar treatment in conjunction with a vacuum application has been used to prepare a frozen fruit (U.S. Pat. No. 2,702,248).

However, these conventional methods have not been suitable to form a particular type of dehydrated fruit—namely, one which has the color, texture, appearance and the aromatic and flavor notes of natural fruit after it has been reconstituted; has a fine, porous structure in the dehydrated state; has a relatively undamaged cell structure; is opaque and non-sticky; has a good rate of reconstitution; is edible after limited rehydration; and has a relatively low moisture content, e.g., 5%. The sun-dried products, for instance, usually have a relatively high moisture content, e.g., 20 to 24% water, and are shrunken and rubbery. Even if the moisture in the fruit is reduced to 10% or below by oven drying or vacuum drying, the rate of rehydration upon addition to water is rather slow; the fruit after subsequent cooking frequently has a very tart, sour flavor and sometimes it is hardly recognizable as the fruit that has been dehydrated. In other words, the dried fruit lacks true fruit flavor. A dehydrated fruit with a low moisture content prepared in accordance with some of the prior art techniques may have a dense, translucent structure, may be very weak relatively in fruit flavor or may lack a considerable amount of the more subtle fruit aroma which heretofore has been difficult to retain during dehydration.

It has now been discovered that a dehydrated fruit with all of the aforementioned desired qualities may be provided. This is accomplished by employing a process with several critical steps therein. Thus, in accordance with this invention a fruit, e.g., an apple, is prepared for dehydration by washing, coring or pitting, slicing and/or treating with browning inhibitors. All of these operations are usually conducted without applying any amount of heat, such as blanching, which will raise the temperature of the fruit substantially. This prepared fruit is immersed in a sugar solution until the sugar uptake value as defined herebelow is at least about 0.4 at conditions of time, temperature and concentration which provide after dehydration an opaque, rather than a translucent, dehydrated fruit. After the fruit is removed from the solution, it is dried, for example, in a hot air oven.

Any fruit compatible with sucrose is applicable to this invention, such as apples, pears, peaches, apricots, cherries, strawberries, grapes, pineapples, plums, bananas, watermelons, raspberries, oranges and the like. As defined herein, "a fruit" is a fresh ripe or green fruit or a frozen fruit in which the cellular structure is not broken down. It is a critical feature of this invention that canned fruits, overripe fruits or frozen fruits in which the cellular structure is broken down can not be used.

A fruit is initially prepared for the sugar treatment. The preparation will vary according to the fruit being used. For example, apples may be pared, cored and sliced; strawberries may be washed and sliced; grapes may be washed; oranges may be sectioned; and peaches may be peeled, pitted and sliced. The preparation may also include dipping the fruit in an aqueous solution of sulfite (sulfiting), as provided by sodium bisulfate, sodium sulfite or other agents known in the art, or in a sodium chloride solution to prevent browning. It is critical for the success of the invention that the preparation does not include blanching the fruit, that is, heating the fruit to a high temperature which substantially destroys or weakens tissue structures and destroys enzymes. These high temperatures, e.g., cooking or high blanching temperatures, must not be employed in any of the subsequent steps in the process prior to actual dehydration. Therefore, "preparing a fruit" as defined herein includes the steps of washing, coring, slicing and the like but excludes a blanching step.

The prepared, unblanched fruit is then immersed into an aqueous sugar solution. It is necessary to employ a crystallizing sugar, such as sucrose. Noncrystallizing sugars, such as corn syrup, are inoperative since the resulting dehydrated products are tacky, rubbery and excessively hygroscopic. The temperature and concentration of the sugar solution and the time for immersion will vary according to the fruit being treated. However, it is critical to use time, temperature and concentration conditions to provide a sugar uptake value (SUV) at least of about 0.4. The sugar uptake value (SUV), which is the measure of sugar uptake by the fruit, is determined as follows:

$$SUV = \frac{\left(\begin{array}{c}\text{dry weight of}\\\text{treated fruit}\end{array}\right) - \left(\begin{array}{c}\text{dry weight of}\\\text{starting fruit}\end{array}\right)}{(\text{dry weight of starting fruit})}$$

In other words, this value is determined by measuring the weight of the fruit solids before the sugar treatment and by measuring the weight of fruit solids and sugar in the fruit after sugar treatment and dehydration. The sugar in the fruit includes the sugar on the surface of the fruit besides the sugar inside the fruit. An SUV under about 0.4, e.g., 0.1, is unsatisfactory since there is not enough sugar in the fruit to provide the benefits of the treatment with respect to flavor and texture. The preferred value is between about 0.5 and about 2. An SUV above about 2 may be impractical and unnecessary but it is satisfactory if achieved without harm to the fruit. However, the rate at which sugar is taken up by the fruit increases markedly as the temperature of the sugar-impregnation operation is increased. Although at high temperatures it is generally very easy to obtain a sugar uptake value substantially over 2, this is unsatisfactory if the temperature used causes the dehydrated product to be nonopaque.

It is also critical that the conditions of time, temperature and concentration be selected to provide a fruit which on dehydration is opaque. If conditions are chosen which provide a dehydrated fruit which is translucent, the desirable qualities obtained by this invention are lost. The opacity of the dehydrated fruit undoubtedly is at least partly the result of its porous character. Some fruits, such as strawberries, are fairly translucent in their fresh state. When properly treated and dehydrated according to this invention, however, they provide an opaque, porous structure. When improperly treated, on the other hand, they may give a dry product which reconstitutes to fruit with reduced flavor and soft, undesirable texture. In general, fruits which are translucent after dehydration are soft; lack flavor; disintegrate too quickly during prolonged cooking; and have the appearance and soft texture of well-cooked fruits when cooked for only a few minutes. Preventing this translucency will result in a dehydrated fruit which behaves in a similar manner as fresh fruit, that is, during cooking it remains firm when incompletely cooked and only softens, changes color and becomes translucent as the cooking proceeds.

The most important factor in preventing loss of porosity and opacity is temperature. Apples or other hard fruits may be impregnated with sugar by using a solution with a temperature as high as 80° C. without substantial loss in opacity. Pears or other fruits of intermediate hardness, on the other hand, become translucent and lose flavor if the temperature of the sugar solution is over about 50° C., and the dehydrated fruit is translucent. Even a lower temperature is required for the soft fruits; if peaches are treated, room temperature is approximately the maximum temperature for the sugar solution. The time for the treatment will depend on the temperature, concentration which generally is over 30° Brix, e.g., 50° to 60° Brix, area of exposed surface and amount of agitation.

The browning inhibitors heretofore discussed can also be included in the sugar solution. Furthermore, any water withdrawn from the fruit by osmosis may be removed by evaporation and the sugar solution may be reused.

After treating, the fruit is removed from the sugar solution and dehydrated to a relatively low moisture content. A "dehydrated fruit" is defined herein as a product having enough water removed to cause improved stability with respect to flavor, texture and bacterial decomposition. Therefore, it may have little water content, e.g., 5%, or an appreciable amount of water, e.g., 25%. The dehydration can be performed by any artificial means known in the art so long as excessive conditions which will harm the fruit are not used. The fruit may even be dehydrated in hot air without losing its desirable properties as compared to an improperly treated, e.g., overheated, sugar-impregnated, air dried fruit which is a dense, sticky product that may not reconstitute fast enough, or not at all, to its original size and shape. Vacuum drying is also applicable herein but it is less economical.

As indicated above, it is extremely critical that the final, dehydrated product be porous and opaque as opposed to dense and translucent. Under optimal conditions, it is sponge-like with small, tightly packed pores. It is only when the sponge-like characteristics are achieved that the fruit reconstitutes to a product with full body and good, full flavor rather than a washed-out flavor, and only then is the dehydrated product firm and nontacky. It is believed, as stated heretofore, that porosity and accompanying opacity are a reflection of dehydration with reduced damage to the cell structure. Some fruits are translucent initially, e.g., oranges, berries, but when treated according to this invention and dehydrated subsequently they give porous, opaque products. Other fruits, e.g., apples and pears, are more opaque than translucent in the fresh state. When treating this opaque type fruit with sugar, it may become translucent even prior to dehydration; for example, precooking apples followed by optimal treatment for this fruit results in a translucent, dehydrated product. However, this product is poor in flavor, texture and overall eating qualities as compared to one identically made without precooking. Therefore, one can insure a proper end-product in the case of some fruits by observing processing precautions which avoid the development of translucency before, during, or after impregnation with sugar.

Thus, in accordance with this invention a new product, that is, a new dehydrated fruit, has been provided. This new dehydrated fruit is porous and opaque, and it unexpectedly has a greater retention of the aromatic and subtle flavor notes of the natural fruit. This unusual retention of flavor quality is pronounced to such an extent that varieties of a given fruit with different flavor characteristics may be distinguished from each other both in the dehydrated state and after reconstitution. It is probable that opacity is the result of porosity, which in turn is a reflection of lack of damage to the cell structure; this, in conjunction with the effect of sugar on flavor and structure retention, results in marked reduction in flavor loss during dehydration. Furthermore, the texture of the product prepared herein is tough and relatively non-sticky which facilitates handling. Despite its high sugar content, the new dehydrated fruit does not reconstitute unusually quickly. It rehydrates better than ocnventionally dried fruit in starch-containing water, undoubtedly due to osmotic effects, but at about the same rate as conventional low-moisture fruits in boiling water; in contrast, prior art sugar-treated fruits reconstitute very rapidly.

Cooking behavior of the dehydrated fruit of the present invention is important. Dehydrated fruits, in the past, usually were considered "done" and edible only after thorough cooking even though the raw, fresh fruit was edible. The present products, however, are quite edible after only limited rehydration; they are also similar to fresh apples or other fresh fruits since they are edible when not completely cooked and during cooking their flavor changes from that of the fresh apple to that of the fresh apple cooked. Moreover, the above dehydrated fruit does not have to be cooked separately before adding starchy ingredients. This is important in applications where starch is used in a fruit filling.

The internal structure of this new dehydrated product is also significant. It has a fine, porous structure whereas improperly prepared dehydrated fruit has a dense structure. By introducing sugar into the fruit in accordance with the present invention, the integrity of the cell walls appears to be maintained during dehydration with the obtention of porosity. Prior to this invention, the cell structure was destroyed by introducing water-soluble solids to plump the fruit.

The following examples are submitted to illustrate but not to limit this invention. Unless otherwise indicated, all parts and percentages in the specification and claims are based upon weight.

*Example I*

Fresh New York State McIntosh apples, which had been held in controlled atmosphere storage for approximately 4 months, were prepared for a sugar treatment by paring, coring, slicing to 10–12 mm. diameter segments, dipping for 1 minute in an aqueous 0.1% $NaHSO_3$ solution to retard browning of the exposed surfaces and draining. The prepared slices were placed in a stainless steel mesh basket and dipped in 67° Brix sucrose solution with 0.1% $NaHSO_3$, contained in a stainless steel steam jacketed kettle (10 gallon capacity). During a 45 minute dipping period the temperature of the syrup was maintained at 80° C. and a centrifugal pump (flow rate, 7 gallons per minute) circulated the syrup constantly. After the dipping was completed, the basket was removed from the kettle and the sugar treated slices therein were allowed to drain for 20 minutes.

The sugar treated slices were subsequently placed on perforated trays (at a tray load of 2–3 lbs./sq. ft.) and dried in a Proctor and Schwartz cabinet hot-air drier at 150° F. for 16 hours by using maximum air velocity and by directing the air through the bed of apple slices.

The dried slices were then removed from the trays, placed in moisture proof bags and stored at room temperature.

The following results were noted during this procedure:

| | |
|---|---|
| Initial weight of fresh apple slices _____gm__ | 10,000 |
| Initial moisture of fresh apple slices _____percent__ | 88 |
| Initial Brix of syrup _____ | 67° |
| Initial weight of syrup _____gm__ | 25,000 |
| Brix of syrup after dip _____ | 59° |
| Final weight of dehydrated slices _____gm__ | 2600 |
| Final moisture of dehydrated slices _____percent__ | 5.8 |
| Final sulfite level _____p.p.m__ | 250 |
| Sugar uptake value _____ | 1.0 |

The sugar treated dehydrated fruit of this invention, after being cooked in water, had a much stronger apple flavor and aroma than comparable fruit that was air dried by conventional means.

Example II

Fresh peaches (Clingstone) were received and held at 33° F. until they were prepared for sugar treating. In the first step of this preparation, the peaches were peeled by (1) dipping them in 8% sodium hydroxide solution for 2–3 minutes, (2) placing the peaches in flowing water and rubbing off the loosened skins and (3) rinsing the peaches in a 2% citric acid solution for 2–3 minutes to neutralize any residual alkali thereon. The peaches were then pitted and sliced into wedge-shaped segments approximately 8 mm. thick at the edge by 50 mm. in length. The slices were dipped in a 0.5% $NaHSO_3$ aqueous solution for 30 seconds to prevent browning, drained and held at room temperature for sugar treatment.

The prepared peach slices were subsequently placed in a large mesh nylon bag which was immersed in a 67° Brix sucrose solution containing 0.5% $NaHSO_3$ and 0.5% ascorbic acid for 22 hours at room temperature. The treated slices were then drained for 20 minutes and either dried for 16 hours on trays (2–3 lbs./sq. ft.) in the Proctor and Schwartz Cabinet drier at 150° F. or dried for 14 hours in a Stokes Vacuum drier at 140° F. plate temperature and 20 mm. Hg vacuum. After drying, the slices were placed in moisture-proof plastic bags and stored at room temperature.

The results of this procedure are indicated herebelow:

| | |
|---|---|
| Total initial weight of fresh peach slices ____gm__ | 6000 |
| Initial moisture of fresh peach slices ____percent__ | 87 |
| Initial Brix of syrup _____deg__ | 67 |
| Initial weight of sugar syrup _____gm__ | 7000 |
| Brix of syrup after dip _____deg__ | 46 |
| Sugar uptake value _____ | 0.7 |

| | Vacuum Drying of One Portion | Air Drying of Remaining Portion |
|---|---|---|
| Weight of slices, gm | 4,000 | ¹ 2,000 |
| Weight of slices after drying, gm | 920 | 469 |
| Moisture of slices after drying, percent | 5 | 6 |

¹ Fresh basis.

Both the vacuum-dried and air-dried sugar treated products after being reconstituted for 5 minutes in boiling water were very flavorful and had good firm texture. In contrast, commercially dried peaches, reduced to 5% moisture, lacked aromatic flavor quality and full body.

Furthermore, frozen peaches which were similarly treated and reconstituted had less flavor and aroma than the aforementioned reconstituted sugar treated, dehydrated fresh peaches, even though the frozen peaches themselves had excellent, strong flavor. Apparently, the freezing operation used broke down the structure of the peaches and, therefore, they lacked certain characteristics critical to their use in this invention.

Example III

Fresh New York State sour red cherries (Montmorency variety) were held at 33° F. They were then prepared for sugar treatment by inundating them with ice water for ½–1 hour to firm the tissue of the fruit and to wash the fruit free from any residual insecticide, destemming and removing pits by punches. The prepared cherries were held at 50° F. for sugar treatment.

A 67° Brix sucrose solution was formed containing 0.10% $NaHSO_3$ and 0.1% FD&C Red #4 dye. The prepared cherries were placed in a fine mesh nylon bag and were inundated subsequently with the above solution for 22 hours at room temperature. After this dipping, the bag was removed and the sugar treated cherries therefrom were drained for 15–20 minutes and air-dried in a Proctor and Schwartz Cabinet drier at 150° F. for 16 hours with maximum updraft air flow. The resulting dehydrated cherries were stored in moisture-proof plastic bags at room temperature and subsequently used in dessert product formulations.

The following results were noted:

| | |
|---|---|
| Initial weight of fresh pitted cherries _____gm__ | 2000 |
| Initial moisture of fresh pitted cherries __percent__ | 83 |
| Initial Brix of syrup _____deg__ | 67 |
| Initial weight of syrup _____gm__ | 2000 |
| Final weight of dehydrated cherries _____gm__ | 505 |
| Final moisture of dehydrated cherries ___percent__ | 6 |
| Sugar uptake value _____deg__ | 0.4 |
| Color of dehydrated cherries _____ | Bright red |
| Reconstitution characteristics: Tender and strong in flavor, after 7 minutes in boiling water. | |

Frozen cherries which were treated in a similar manner as the above fresh cherries were not as flavorful and aromatic. These frozen cherries apparently had undergone cellular damage or structural change.

Example IV

Fresh apples were sugar treated, dehydrated and reconstituted as described heretofore in Example I except that the syrup temperature was 100° C. Although the sugar uptake was good (the sugar uptake value was 2), the slices were translucent and dense after dehydration as compared to the opaque, sponge-like structure of the apples in Example I that were treated with syrup at 80° C. Moreover, the dehydrated slices of this example became very soft on reconstitution and had significantly less apple flavor and lower quality than the reconstituted apples of Example I.

Example V

Fresh Bartlett pears were peeled and cored in a conventional manner, treated as described in Example I with sugar syrup except that part of them were treated at room temperature or 50° C. for 16 hours and the remaining part of them were treated at 80° C. for 1 hour or ¾ hour and air-dried. The sugar uptake value was 1.0.

The dehydrated fruit treated at 50° C. was opaque and it reconstituted in only a few minutes in boiling water to a product with exceptionally good texture, flavor and aroma. Conversely, the dehydrated fruit treated at 80° C. was translucent and it reconstituted to a relatively soft product that was somewhat "washed out" in flavor.

Examples IV and V demonstrate that it is critical during the sugar treatment to use conditions of temperature and also time and concentration which will prevent the fruit from becoming translucent.

Example VI

Peaches were treated as per Example II, except that peaches in the sugar syrup were agitated very gently by means of a tumbling action. A product which was similar to the product of Example I was obtained with a sugar uptake value of 0.7 after only 2 hours of tumbling. Therefore, this tumbling technique reduced the time required for the sugar treatment.

*Example VII*

Canned peach slices (Freestones) were treated by adjusting the sugar content of the syrup used for canning to 67° Brix, and by using the resultant syrup for further treatment of the slices. The treated slices were dehydrated as described in Example I.

Although the texture and flavor of the slices were excellent prior to the sugar treatment and dehydration, a translucent product was formed. After boiling in a small amount of water, the reconstituted fruit therefrom was relatively weak in flavor and excessively soft in texture. Heating the peaches to an excessively high temperature during canning undoubtedly caused these poor results.

Having set forth the general nature and specific embodiments of the present invention, the true scope is now particularly pointed out in the appended claims.

What is claimed is:

1. A process for forming a dehydrated fruit which comprises preparing an unblanched fruit for dehydration, said fruit being a hard fruit, a fruit of intermediate hardness or a soft fruit; treating said prepared fruit with a solution of a crystallizing sugar until the sugar uptake value is at least about 0.4 at conditions of time, temperature and concentration to form after dehydration an opaque, porous fruit, said temperature being as high as about 80° C. for a hard fruit, not over about 50° C. for a fruit of intermediate hardness and a maximum of about room temperature for a soft fruit; and drying the sugar treated fruit therefrom to provide a dehydrated product.

2. A process for forming a dehydrated hard fruit which comprises preparing an unblanched hard fruit for dehydration; treating said prepared fruit by immersing it in a solution of a crystallizing sugar until the sugar uptake value is at least about 0.4 at conditions of time, temperature and concentration to form after dehydration an opaque, porous fruit, said temperature being as high as about 80° C.; and drying the sugar treated fruit therefrom to provide a dehydrated product.

3. The process according to claim 2 in which the hard fruit is apples, in which the sugar is sucrose, and in which the concentration is over 30° Brix.

4. A process for forming a dehydrated fruit of intermediate hardness which comprises preparing an unblanched fruit of intermediate hardness for dehydration; treating said prepared fruit by immersing it in a solution of a crystallizing sugar until the sugar uptake value is at least about 0.4 at conditions of time, temperature and concentration to form after dehydration an opaque, porous fruit, said temperature being not over about 50° C.; and drying the sugar treated fruit therefrom to provide a dehydrated product.

5. The process according to claim 4 in which the fruit of intermediate hardness is pears, in which the sugar is sucrose and in which the concentration is over 30° Brix.

6. A process for forming a dehydrated soft fruit which comprises preparing an unblanched soft fruit for dehydration; treating said prepared fruit by immersing it in a solution of a crystallizing sugar until the sugar uptake value is at least about 0.4 at conditions of time, temperature and concentration to form after dehydration an opaque, porous fruit, said temperature being a maximum of about room temperature; and drying the sugar treated fruit therefrom to provide a dehydrated product.

7. The process according to claim 6 in which the soft fruit is peaches, in which the sugar is sucrose and in which the concentration is over 30° Brix.

References Cited

UNITED STATES PATENTS

| | | | |
|---|---|---|---|
| 2,834,681 | 5/1958 | Kreager | 99—102 |
| 3,032,419 | 5/1962 | Limpert | 99—102 |
| 3,281,251 | 10/1966 | Templeton | 99—204 |

RAYMOND N. JONES, *Primary Examiner.*

A. LOUIS MONACELL, *Examiner.*

M. VOET, *Assistant Examiner.*